United States Patent [19]

Emmet

[11] 3,707,871
[45] Jan. 2, 1973

[54] SENSOR FOR A VARIABLE-PRESSURE ROLLING BALL VISCOMETER
[75] Inventor: Robert T. Emmet, Glen Burnie, Md.
[73] Assignee: The United States of America as represented by the Secretary of the Navy
[22] Filed: Dec. 14, 1970
[21] Appl. No.: 97,561

[52] U.S. Cl. .................................. 73/57, 264/262
[51] Int. Cl. .............................................. G01n 11/12
[58] Field of Search .......................................... 73/57

[56] References Cited

UNITED STATES PATENTS

| | | | |
|---|---|---|---|
| 1,247,523 | 11/1917 | Flowers | 73/57 |
| 2,320,218 | 5/1943 | Buckley | 73/57 |
| 2,320,219 | 5/1943 | Buckley et al. | 73/57 |
| 3,026,716 | 3/1962 | Connally, Jr. | 73/57 |

OTHER PUBLICATIONS

Stanley et al. Rolling Ball Viscometer in Analytical Chemistry. 40 (11): p. 1751–1753. Sept. 1968.
Exline et al. Viscosity Determination of Sub-surface Samples in American Petroleum Inst. p. 659–665 Nov. 1939.

Primary Examiner—Louis R. Prince
Assistant Examiner—Joseph W. Roskos
Attorney—R. S. Sciascia and Q. E. Hodges

[57] ABSTRACT

The present invention relates to a variable-pressure rolling ball viscometer which is essentially invarient to pressure, and has improved mechanical stability. The pressure insensitivity of the new viscometer is obtained by including in the manufacturing of the sensor circuits a step wherein the thermosetting resin used is cured under high pressure.

8 Claims, 2 Drawing Figures

PATENTED JAN 2 1973 3,707,871

INVENTOR.
ROBERT T. EMMET
BY *J. E. Hodges*
ATTORNEY

SENSOR FOR A VARIABLE-PRESSURE ROLLING BALL VISCOMETER

The invention described herein may be manufactured and used by or for the Government of the United States of America for governmental purposes without the payment of any royalties thereon or therefor.

BACKGROUND OF THE INVENTION

A viscometer is an instrument used for accurately measuring changes in viscosity of electrolyte solutions or fluids in general. Information of this type is useful in the design of submersible water vehicles such as submarines. Previous devices suffer from severe inaccuracies in higher pressure ranges, inaccuracies due to flexure of the test chambers, and total failure of the instrument due to electrical shorts in the sensing circuits.

PRIOR ART

The closest known prior art is found in an article in "Analytical Chemistry" vol. 40, pp. 1751, Sept. 1968 entitled "Rolling-Ball Viscometer for Measuring Viscosity of Fluids at High Pressures and Moderate Temperatures." While this article discloses a viscometer somewhat similar to the present invention it does not employ the unique sensor bar of the present invention.

OBJECTS OF THE INVENTION

A primary object of the invention is to produce a viscometer which is insensitive to pressure.

Another object of the invention is to produce a device which is not suseptable to electrical failure due to leakage of the pressurized liquid into the electrical sensing circuitry.

Another object of the invention is to avoid inaccuracies due to mechanical flexure of the test chambers.

SUMMARY OF THE INVENTION

The present invention relates to a sensor for a viscometer which renders the viscometer insensitive to pressure variations, and to a method of making said sensor. The unique method of manufacturing the sensor bar accounts for the pressure insensitivity of the viscometer and provides a ten fold increase in accuracy in the higher pressure ranges over the prior art.

DESCRIPTION OF THE PREFERRED EMBODIMENT

Figure 1:
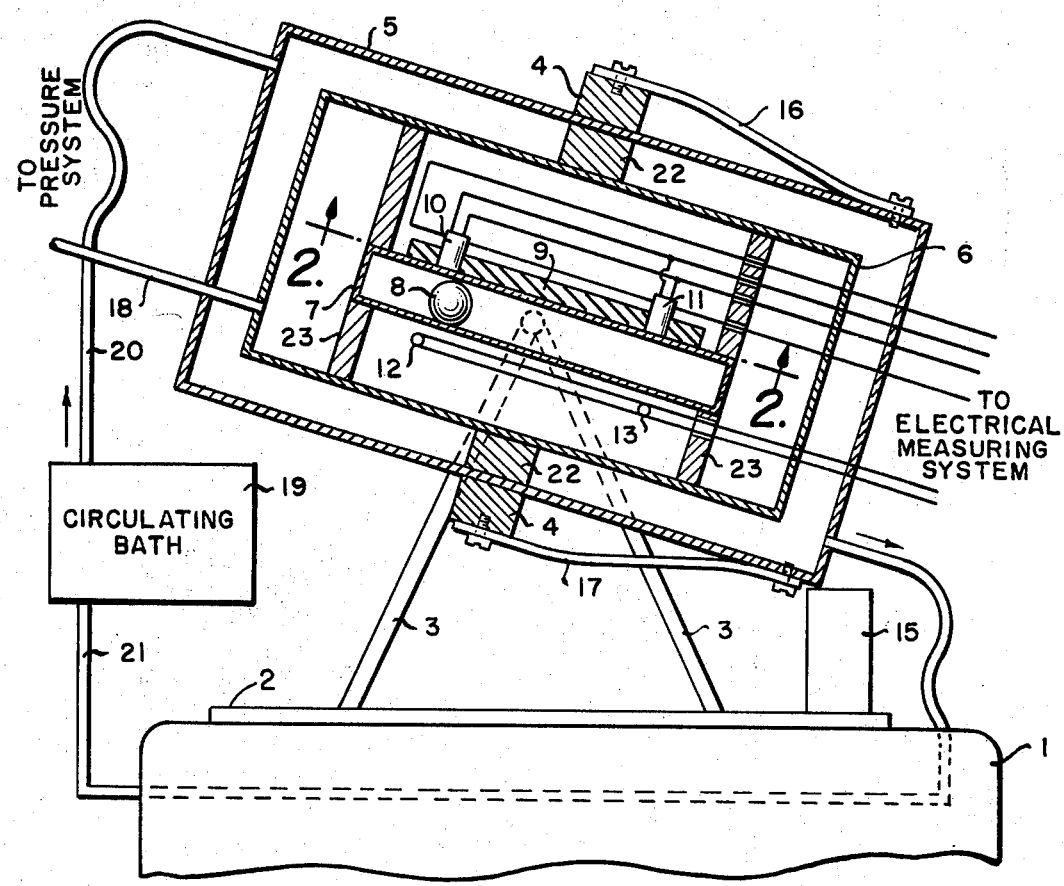
FIG. 1 is a cross-sectional view of the rolling ball viscometer.

The viscometer as shown in FIG. 1 includes a concrete base 1 to which is secured a steel plate 2 and support members 3. The support members 3 are attached to a collar 4 which surrounds and holds the outer water jacket 5 of the viscometer. The water jacket 5 provides a temperature bath for a pressure vessel 6 located within the outer jacket 5. Inner support 22 located at the midpoint of the pressure vessel 6 supports the vessel within the water jacket 5. Within the pressure vessel 6 is a measuring barrel 7 supported at the ends by barrel supports 23. In the measuring barrel is the fluid under test and a rolling ball 8. One end of the measuring barrel 7 is flexible so that the pressure of the test fluid in the measuring barrel 7 is equal to the pressure of the fluid in the pressure vessel 6. On the outside of the measuring barrel 7 is mounted a bar 9 which supports and holds two electromagnetic sensing probes 10 and 11.

It has been discovered that the inaccuracy due to pressure variation present in viscometers is caused by a variation with pressure of the distance between the sensor probes 10 and 11. In order to correct this problem the following method of manufacturing the sensor probe was developed:

first, position the sensor probes in appropriate apertures in the mounting bar 9;

second, pour an iron-bearing thermosetting resin (epoxy) around the sensor coil filling the void between the coil and the walls of the aperture in the mounting bar;

third, subject the above structure to a pressure of approximately 1,100 bars;

fourth, allow the thermosetting resin to cure *under pressure*; and fifth, remove the above formed sensor bar from the curing area and mount in the viscometer as shown in FIG. 1.

It has been found that curing the epoxy under pressure eliminates the shift of the sensor probes with test pressures.

Figure 2:
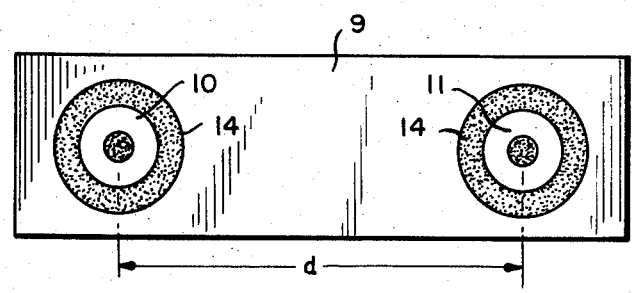
FIG. 2 is a view taken along line 2—2 showing the rolling ball sensors.

FIG. 2 shows the cured sensor bar consisting of metallic bar 9, sensor probes 10 and 11, and the iron-bearing thermosetting resin 14 (epoxy) which secures the sensor probes in the metallic bar. The iron bearing resin acts as a shield to prevent pickup by the sensor probes of extraneous signals. The metallic bar also acts to reinforce the measuring barrel along its longitudinal axis. The pressure vessel is filled with a fluid which is electrically inert such as Electrical Fluid FC–77 made by the Minnesota Mining and Manufacturing Company. Such a fluid eliminates the need for sealing the electrical measuring system, since electrical short circuits in the sensing system caused by the pressure fluid can not occur.

Also within the pressure vessel are two temperature sensing thermistors 12 and 13. In order to attain the accuracies desired the temperature of the fluid under test must be closely controlled, hence the temperature sensing thermistors are used to indicate the fluid temperature and also to indicate when thermal equilibrium has been reached.

In order to obtain the accuracy desired the angle of tilt of the test barrel must be reproducable.

If the angle varies by more than 5 seconds of arc the data obtained will be useless. To achieve the reproducability the tilt angle of the viscometer is set by the steel reference block 15. During the test of the new viscometer it was discovered that the water jacket 5 bowed along its longitudinal axis between the support points of the collar 4 and the reference block 15. This flexure of the device caused significant errors to appear in the data obtained from the instrument. To eliminate this error two tensioned steel braces 16 and 17, running parallel to the longitudinal axis of the jacket 5, are employed. These braces are connected between the supporting collar 4 and the water jacket 5 and act to stiffen the water jacket so that the bowing thereof does not occur.

The pressure within the pressure vessel 6 is regulated from the pressure system (not shown) via conduit 18. This pressure maybe varied as required for each test.

The temperature of the pressure vessel and the fluid under test is maintained by the water within the water jacket which is circulated by the circulating bath 19 via inlet conduit 20 and outlet conduit 21.

Variations in the above disclosed viscometer which are obvious to one skilled in the art are deemed to be within the scope of the disclosure without departing from the spirit thereof.

What is claimed is:

1. A rolling ball viscometer having an outer water jacket, a support for said water jacket, a pressure vessel within said water jacket, a viscosity measuring barrel within the pressure vessel, and pressure insensitive sensor means mounted on said measuring barrel, the invention comprising:
   a sensor bar having at least two apertures therein for receiving sensor probes, and a thermosetting resin which is cured under pressure filling the void between the sensor probe and the walls of the aperture in the sensor bar.

2. A device as defined in claim 1, which further includes:
   electrically inert fluid means within the pressure vessel to transmit the desired pressure to the measuring barrel and to allow the use of unsealed sensing circuits within the pressure vessel.

3. A device as defined in claim 2, wherein the sensor probe is the electromagnetic type.

4. A device as defined in claim 3 wherein the thermosetting resin is an iron-bearing epoxy for shielding the sensor probes from extraneous signals.

5. A device as defined in claim 4, including brace means between the support and the water jacket for reinforcing said water jacket and thereby preventing deformation along the longitudinal axis of said water jacket.

6. A rolling ball viscometer comprising:
   an outer jacket for providing a temperature control bath;
   a pressure vessel mounted within said outer jacket;
   a viscosity measuring barrel mounted within said pressure vessel;
   support means attached to said outer jacket and adjustable to provide selected tilt angles to said viscosity measuring barrel; and
   sensor means mounted in contact with said barrel; means mounted on said barrel for positioning said sensors and for resisting sagging of said barrel.

7. Apparatus as defined in claim 6 including:
   brace means between said support means and said outer jacket for preventing sagging of said jacket.

8. Apparatus as defined in claim 7 further including:
   inner support means between said pressure vessel and outer jacket for transmitting the reinforcing effect of the brace means to said measuring barrel.

* * * * *